United States Patent

[11] 3,591,908

| [72] | Inventor | Carl R. Pepmeier<br>Fredericksburg, Va. |
| --- | --- | --- |
| [21] | Appl. No. | 830,667 |
| [22] | Filed | June 5, 1969 |
| [45] | Patented | July 13, 1971 |
| [73] | Assignee | FMC Corporation<br>Philadelphia, Pa. |

[54] METHOD OF MAKING SHEET MATERIAL HEATING AND HUMIDIFYING DEVICE
1 Claim, 3 Drawing Figs.

[52] U.S. Cl. .................................................. 29/157.3 R,
29/157 C, 156/307, 156/497, 239/134, 239/568
[51] Int. Cl. ....................................................... B21d 53/02,
B23p 15/26
[50] Field of Search .......................................... 156/307,
497; 239/134, 568; 29/157 C, 157.3 R

[56] References Cited
UNITED STATES PATENTS

| 515,598 | 2/1894 | Malam et al. ................... | 29/157 C |
| --- | --- | --- | --- |
| 1,490,064 | 4/1924 | Madden .......................... | 165/168 |
| 2,409,294 | 10/1946 | Martin ............................ | 138/44 |
| 3,322,593 | 5/1967 | Conti .............................. | 156/307 |
| 3,386,659 | 6/1968 | Rea ................................. | 239/132 |
| 3,467,313 | 9/1969 | Pepmeier ....................... | 239/134 |

Primary Examiner—John F. Campbell
Assistant Examiner—D. C. Reiley
Attorneys—Thomas R. O'Malley, George F. Mueller and Eugene G. Horsky ABSTRACT: A method of making a steam chest for use in a laminating apparatus for concomitantly heating and humidifying traveling sheet materials immediately prior to laminating of the same.

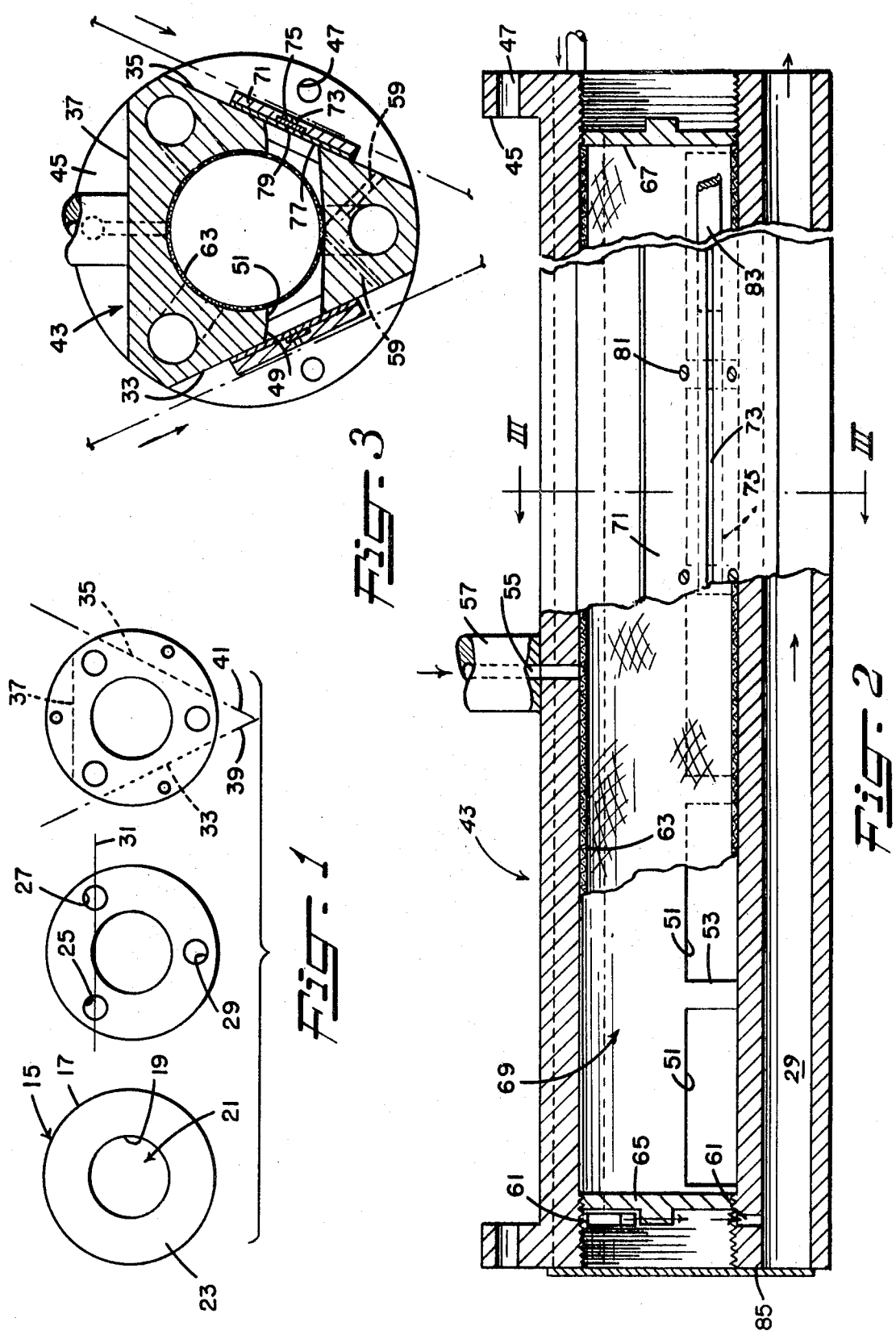

METHOD OF MAKING SHEET MATERIAL HEATING AND HUMIDIFYING DEVICE

The present invention is directed to a method of making an improved steam chest for heating and humidifying traveling sheet materials.

United States Patent No. 3,322,593 describes a method and apparatus in which hydrophilic sheet materials, having a coating of thermoplastic material on at least one of the opposing sides thereof, are heated to soften such coating and are concomitantly humidified by moist steam immediately prior to being pressed together to provide a composite product. Heating of the sheet materials, as well as humidification thereof, is achieved by an electrically heated shoe from which moist steam is discharged and impinged against the sheet materials as they are being advanced along separate paths.

Basically, the heated shoe employed in the above-noted method includes a hollow triangular-shaped chamber into which moist steam is delivered and from which it is discharged through one or more openings. A series of electrical heaters are embedded in the walls of such chamber for maintaining the same at a desired elevated temperature. While such electrically heated shoes are capable of providing the necessary effects, the use of electrical heaters, and their required controls, wires, panels, etc., not only make such shoes expensive to construct and maintain, but are cumbersome during use in view of the many elements which project therefrom. Additionally, electrical heaters do not provide for as uniform a heat distribution along the entire length of the shoe as is desired, require long periods for heating and cooling, and when improperly controlled may cause damage to the sheet materials which are being laminated as well as to the shoe itself.

In my U.S. Pat. application, Ser. No. 637,519, now U.S. Pat. No. 3,467,313, there is disclosed a steam chest which employs no electrical heaters and which is formed of a plurality of metallic plates welded together to provide an elongated hollow body of generally triangular cross section. Welded partitions divide this hollow body into three longitudinally extending chambers, the outermost of which are connected to each other and through which a heated fluid is circulated under pressure. Moist steam is delivered under pressure into the other of such chambers and is discharged therefrom through openings in the hollow body.

Considerable welding is involved in the manufacture of such steam chest and, in the absence of special and expensive fixtures, pronounced buckling of the various parts is experienced. Moreover, stresses usually are introduced into various parts of the steam chest during the welding thereof and, under the pressures of the fluids circulated therethrough, distortion of the steam chest and/or failure of welded joints and loss of the required fluid tight integrity of the different chambers often occurs during actual use of the steam chest. Accordingly, a primary object of this invention is to provide an improved and more satisfactory method of making a steam chest for concomitantly heating and humidifying traveling sheet materials.

Another object of this invention is the provision of a method for making an improved metallic steam chest having a minimum of welded connections and which is adapted to maintain a desired structural and fluid tight integrity under various conditions of operation.

A further object is the provision of a method of making a metallic steam chest through which separate fluid are circulated under pressure, which method is simple and economical, requires no special tools or fixtures, and introduces no significant stresses into parts of the steam chest itself.

These and other objects are accomplished in accordance with the present invention by a method for making a steam chest which includes a unitary, elongated metallic body having a wall defining an opening extending longitudinally therethrough. Three passages extend lengthwise of the elongated body in substantially parallel relationship with the opening therein and with the longitudinal axes of two of the passages being disposed in a common plane and spaced substantially equal distances from the longitudinal axis of the other of such passages. The elongated body is formed with two like substantially flat outer surfaces which extend along planes which intersect at like acute angles with the common plane passing through the two passages and also intersect with each other at a location adjacent to the other of such passages.

A chamber is formed within the elongated body by a pair of plugs which are positioned within the opening extending therethrough. These plugs are connected in fluid tight relationship with the wall defining this opening and are disposed in spaced-apart relationship with each other and with the ends of the elongated body. Orifices extend between each of the passages and the portion of the body opening located outwardly of one end of the chamber. The ends of the passages and the body opening adjacent to such one end of the chamber are closed off whereby a heated fluid, introduced under pressure into the opposite end of at least one of such passages, may enter into the portion of the body opening located outwardly of the one of the chamber and be exhausted through at least one of the other of the passages.

The elongated body also has an aperture through which moist steam may be introduced under pressure into the chamber. Spaced slots extend longitudinally of and through the flat surfaces and open into the chamber so as to permit the moist steam to be discharged therefrom A plate is attached to each of the flat surfaces of the elongated body and is formed with an elongated orifice which is aligned with the spaced slots in the adjacent flat surface.

While the steam chest has been described as having two flat outside surfaces, the elongated body may be provided with a third flat side, extending parallel to the common plane which passes through the two passages, so as to provide such body with a generally triangular cross section. Desirably, the steam chest includes flanges at its opposite ends by means of which it may be attached to a suitable supporting structure during use.

To insure that the moist steam is discharged under a generally uniform pressure along the entire length of each of the elongated orifices, the flat outer surfaces of the steam chest are each provided with a continuous groove which is aligned with the slots in such surface and the elongated orifices in the covering plates. In addition, a screen is positioned within the steam chest chamber, between the inlet aperture and the slots in the flat surfaces, and serves as a baffle for minimizing pressure differentials in the moist steam which is within such chamber.

In the preferred embodiment means are provided for closing off portions of the elongated orifices in the steam chest plates so as to permit moist steam to be impinged against selected widths of sheet materials or to adapt the steam chest for use with sheet materials of various widths without any waste of moist steam. Also in the preferred embodiment, the steam chest body includes one or more small drainage openings leading from the chamber to facilitate removal of condensate, as for example, during the cooling of the moist steam which is within such chamber after operations are completed.

The steam chest made by the method of the present invention may be formed of any suitable metal having good thermal conductivity, with aluminum being preferred.

In using the above-described steam chest in a laminating apparatus and method as described in United States Patent No. 3,322,593 a heated fluid is delivered under pressure into one end of at least one of the passages in the steam chest body, flows therethrough, and is discharged from the adjacent end of another of such passages. When laminating, for example, continuous regenerated cellulose films having coatings of thermoplastic material on opposing faces thereof, the heated fluid employed is preferably steam at a temperature of at least 212° F. and desirably at 300° to 320° F., and under a pressure of from 60to 80 pounds per square inch.

Once the steam chest is heated to a desired temperature, continuous sheet materials are laced and continuously advanced along converging paths which are adjacent to but spaced from the steam chest covering plates. If necessary, portions of the elongated orifices in such plates are closed off so that the remaining open lengths of such orifices are generally equal to the widths of the sheet materials to be treated. Moist steam is then delivered into the chamber under pressure and, as it issues therefrom and through the elongated orifices in the covering plates, impinges against the opposing faces of the sheet materials which are advanced relative to the steam chest.

The heated fluid circulated through the steam chest serves to maintain the steam chest at a desired elevated temperature so as to effect softening of the thermoplastic material on the opposing faces of the advancing sheet materials. At such elevated temperature, condensation of moist steam within the chamber during actual operations is avoided. The moist steam impinged against the traveling sheet materials serves to humidify the same immediately prior to overlapping and pressing of such sheet materials together. Once laminating operations are completed, the supply of heated fluid and moist steam are cut off. Any moist steam remaining in the steam chest chamber will condense and may be removed either through the plate orifices, as by tilting the steam chest, or through suitable drainage openings.

One of the main advantages of the steam chest described above is its structural and fluid tight integrity, which in turn is the result of the specific method of manufacture which is employed. More particularly, the body of the steam chest is formed from a thick-walled metallic cylinder which is first bored to provide the three passages which extend lengthwise thereof. At least between locations spaced inwardly from the opposite ends thereof, the metallic cylinder is shaped to provide the same with two flat surfaces which, as heretofore described, extend along planes which intersect at like acute angles with a common plane passing through two of the passages and intersect with each other at a location adjacent to the other of such passages.

By the last-described operation, the original metallic cylinder is shaped into a body having a desired external configuration, with the portions of the original cylinder remaining at the ends of such body being in the form of flanges by which the finished steam chest may be attached to a suitable supporting structure. It will be noted that in shaping the steam chest body the original metallic cylinder has not been subjected to any welding or other operations which involve or create excessive heat or which might introduce excessive stresses into the metal itself.

An inlet or supply aperture to the chamber is formed, at a location between the two passages which are disposed in a common plane, and rows of spaced slots extending into the central opening are formed in each of the flat surfaces of the body. One or many drainage openings from such central opening are drilled into the body. Orifices are then formed between each of the passages and the original cylinder opening adjacent to one end thereof.

At this stage plugs are threaded or press-fitted or even welded into the original central opening of the cylinder, at a location between the ends of the rows of spaced slots and the adjacent ends of the body, so as to provide a chamber.

Prior to placement of the plugs within the central opening of the original cylinder a screen, desirably of tubular shape, is inserted into such opening to serve as a baffle during use of the finished steam chest. In view of the massive character of the body, welding of the plugs in place neither causes any apparent distortion of such body nor introduces any stresses which might subsequently induce leakage. Desirably, these plugs are either threaded or press filled in place so as to facilitate easy removal of the same, as to permit cleaning of the chamber and/or screen replacement. Side plates, preformed with elongated orifices, are fixed to the flat surfaces of the body.

In the drawing, FIG. 1 illustrates end views of a metallic cylinder during various stages of the method of the present invention;

FIG. 2 is a shortened side view of the steam chest made by the method of the present invention, with portions thereof shown in section; and FIG. 3 is a transverse vertical section taken along the line III–III of FIG. 2.

With reference to FIG. 1 of the drawing, an elongated metallic cylinder, as for example of aluminum, is indicated by the character 15 and includes an outer wall 17, an inner wall 19 which defines a central opening 21, and end walls 23. As the first step in the method of the present invention three passages 25, 27 and 29 are bored lengthwise through the cylinder at locations between its outer and inner walls 17 and 19. The axes of the passages 25 and 27 are disposed in a common plane, which is indicated by the character 31, and are spaced substantially equal distances from the axis of the passage 29.

Along the entire length, and preferably between locations spaced inwardly from the opposite ends of the cylinder 15, the outer surface 17 thereof is milled or otherwise cut away to provide flat surfaces 33 and 35 and, desirably a further flat surface 37. The surfaces 33 and 35 extend, respectively, along planes indicated at 39 and 41 which intersect with each other at a location adjacent to the passage 29 and intersect with the plane 31 at like acute angles. The flat surfaces 33, 35 and 37, together with the portions of the cylinder outer wall 17 which remain, define the outer periphery of the steam chest body, which is indicated generally at 43, while the remaining end portions of the original cylinder 15 appear as annular flanges 45. Boltholes 47 may be now drilled through the flanges 45 to facilitate attachment of the steam chest to a suitable supporting structure.

A continuous groove 49 is milled into each of the surfaces 33 and 35, with the ends of each such groove being spaced from the ends of the body 43. Preferably at spaced intervals along the length thereof, each of the grooves 49 is milled through to the original central opening 21 to provide therein a row of elongated slots 51. Ribs 53 remain between adjacent slots 51 to insure that a desired structural rigidity is maintained. An aperture 55 is then drilled through the flat surface 37 and into the central opening 21, and a pipe 57 may be welded or otherwise fixed to the body for use in connecting the steam chest to a source of moist steam. Desirably, one or more fine drainage holes 59 are also drilled through the body member, adjacent to the passage 29, and into the opening 21. Covers or plugs may be provided for closing off the holes 59 during use of the steam chest.

At one end of the body 43, orifices 61 are milled or drilled between the central opening 21 and each of the passages 25, 27 and 29. A cylindrical or tubular screen 63 is then inserted into the central opening 21 and a plug 65 is threaded or otherwise fixed in place at a position between the ends of the adjacent slots 51 and the orifices 61. A similar plug 67 is inserted into the opposite end of the central opening 21 and fixed in position outwardly of the ends of the adjacent slots 51 and the adjacent end of the body 43. The plugs 65 and 67, together with the portion of the opening 21 therebetween together define a chamber 69 into which moist steam is delivered though the pipe 57 and aperture 55 and from which it is discharged through the rows of elongated slots 51.

Cover plates 71, which are each preformed with an elongated orifice 73 and a channel 75, together with a spacer plate 77 having a slit 79, are now fixed to the surfaces 33 and 35, as by flatheaded screws 81, with the orifices 73 and slits 79 being aligned with each other and the grooves 49 in the body 43. The orifices 73 in the cover plates 71 and the slits 79 in the spacer plate 77 are alike and no greater in length than the chamber 69. The channels 75, however, extend the entire length of the respective cover plates 71 and receive slats 83 which are slidable longitudinally of such channels 75 to vary the length of the orifices therein through which moist steam may issue.

A thin end plate 85 is now fixed, as by welding, to the end of the body 43 which is adjacent to the plug 65 to close off the adjacent ends of the central opening 21 and the passages 25, 27 and 29. The opposite ends of the passages 25, 27 and 29 may be threaded to facilitate attachment of pipes or hoses thereto for introducing a heated fluid under pressure into at least one of such passages 25, 27 and 29, and removing the same from one or more of the other of such passages. Preferably, the heated fluid, such as steam, is introduced under pressure into both the passages 25 and 27. Such steam serves to heat the body 43 as it flows therethrough, passes through the orifices 61, and continues to heat the body 43 as it is exhausted through the passage 29. One advantage of this arrangement is that one end of the body 43 is free of any projecting pipes or hoses and thus the operator has free access to the steam chest during lacing of sheet materials relative thereto and during adjustment of the steam chest itself.

I claim:

1. A method of making a steam chest having ducts for containing different flows of fluid circulated therethrough including the steps of boring three passages lengthwise of an elongated metallic cylinder at locations between the outer surface thereof and a wall defining a central opening therethrough, with the longitudinal axes of two of such passages being disposed in a common plane and spaced substantially equal distances from the longitudinal axis of the other of such passages, shaping the outer surface of the metallic cylinder at least between locations spaced inwardly from the opposite ends thereof to provide at least two like substantially flat surfaces, said flat surfaces extending along planes which intersect with each other adjacent to the other of said passages and intersect at like acute angles with said common plane, at a location between said two passages providing an aperture into the central opening, forming in each of the flat surfaces a row of slots which terminate inwardly of the ends of the body and open into the central opening, providing orifices between each of said passages and the central opening adjacent to one end thereof, and forming a chamber by disposing a pair of plugs within the central opening between the ends of said rows of slots and the adjacent ends of the body.

UNITED STATES PATENT OFFICE
CERTIFICATE OF CORRECTION

Patent No. 3,591,908          Dated 13 July 1971

Inventor(s)    Carl R. Pepmeier

It is certified that error appears in the above-identified patent and that said Letters Patent are hereby corrected as shown below:

Under References Cited: Patent No. "1,490,064" should be corrected to read -- 1,490,706 --.
Col. 2, line 27, insert a period (.) after "therefrom"; line 73, "60to" should read -- 60 to --.

Signed and sealed this 25th day of January 1972.

(SEAL)
Attest:

EDWARD M. FLETCHER, JR.
Attesting Officer

ROBERT GOTTSCHALK
Commissioner of Patents